Figure 1:
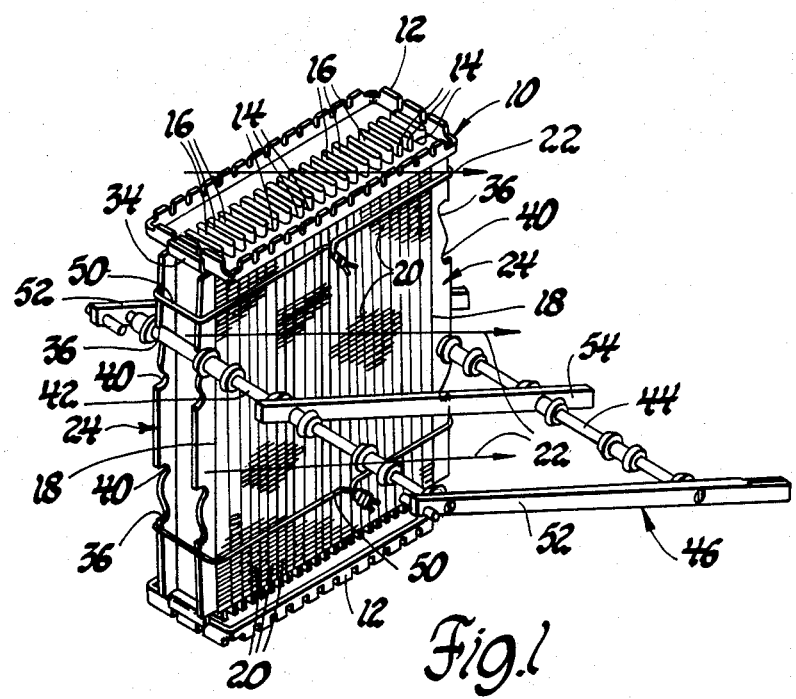

United States Patent [19]

Reynolds et al.

[11] Patent Number: 4,496,818
[45] Date of Patent: Jan. 29, 1985

[54] SUPPORT FOR INDUCTION HEATED WORKPIECES

[75] Inventors: Michael G. Reynolds, Utica, Mich.; Craig E. Brittin, Lockport, N.Y.

[73] Assignee: General Motors Corporation, Detroit, Mich.

[21] Appl. No.: 570,194

[22] Filed: Jan. 12, 1984

[51] Int. Cl.³ .............................................. H05B 6/10
[52] U.S. Cl. .............................. 219/10.57; 219/10.67; 219/10.43; 219/9.5
[58] Field of Search .............. 219/10.67, 10.57, 10.43, 219/9.5, 10.49 R, 7.5, 85 A, 85 R

[56] References Cited

U.S. PATENT DOCUMENTS 4,433,227  2/1984  Brittin ........................... 219/10.67 X
4,443,678  4/1984  Jacovides et al. ............... 219/9.5 X

*Primary Examiner*—Philip H. Leung
*Attorney, Agent, or Firm*—Warren D. Hill

[57] ABSTRACT

Heat exchanger cores comprising an assembly of elongated vertical and horizontal parts are brazed by induction heating in a vacuum chamber where the magnetic heating field is disposed at an angle to the vertical and horizontal planes for uniform heating. Steel supports for strength and durability are used to hold the cores in the vacuum chamber. A pair of elongated steel fixtures engage opposite sides of each heater core, the fixtures having recesses at their outboard surfaces. A rectangular frame having a pair of support rods is held by brackets within the chamber to orient the plane of the frame parallel to the magnetic field to minimize electrical heating of the frame. The recesses in the fixtures engage the support rods of the frame in a manner to hold the vertical parts in a vertical plane and to prevent rotation of the core by action of the magnetic field on the core.

4 Claims, 6 Drawing Figures

U.S. Patent   Jan. 29, 1985   Sheet 2 of 2   4,496,818

SUPPORT FOR INDUCTION HEATED WORKPIECES

This invention relates to an induction heating system and more particularly to an arrangement for supporting parts within an induction heating chamber.

U.S. patent applications assigned to the assignee of this invention, Ser. No. 419,941, now U.S. Pat. No. 4,443,678 "A Method of Induction Brazing a Complex Assembly", Jacovides et al, and Ser. No. 419,942, now U.S. Pat. No. 4,433,227 "A Method of Inductively Heating Workpieces to a Uniform Temperature", Brittin, disclose induction brazing methods which accomplish uniform heating of parts of an assembly even though some of the parts lie in planes at right angles to other parts. The specific application leading to those inventions involves the brazing of aluminum heat exchanger cores which must be evenly and accurately heated so that the aluminum brazing alloy will reach a melting point and yet the aluminum base material does not melt. In addition it is required that the horizontal and vertical portions of the core be held accurately in those orientations so that molten brazing material will flow properly to the joints to be brazed by the material. One of the proposed solutions to uniform heating is aligning the magnetic flux lines of the inductive heating field at a prescribed angle to the horizontal plane so that the vertical and horizontal members are heated evenly. Maintaining the proper angle throughout the brazing process is important in order to obtain uniform temperatures. However, the same magnetic field which causes heating of the cores also interacts with currents induced in the cores to create a force which tries to rotate each core about its center of gravity. Another solution contributing to uniform heating of the heat exchanger core involves the judicious placement of steel heat panels around the assembly or group of cores being heated to compensate for heat losses (for example, losses through radiation) from exterior surfaces of the cores.

In large scale manufacturing, parts being handled for various types of processing are usually carried in groups or singly by steel hangers. It is important that such a hanger not form a complete low resistance loop that links the magnetic flux to avoid the hanger becoming hot enough to locally overheat the cores.

It has been proposed to construct hangers for the assemblies being heated using nonconductive material such as ceramics for at least part of the supporting hardware to prevent induction heating of the hangers. However, repeated usage with the accompanying thermal cycling tends to cause cracking and failure of the ceramic parts.

It is therefore an object of the invention to provide apparatus to support workpieces comprising assemblies of vertical and horizontal parts during induction heating which is sufficiently strong and durable to withstand repeated usage and able to maintain the necessary orientation of the workpieces within the induction heating field. It is a further object of the invention to provide such support apparatus which is consistent with the heating requirements of the workpieces and which is not significantly heated by induction.

The invention is carried out by providing a generally rectangular steel frame including a pair of support rods, mounts within the induction heating chamber for holding the frame parallel to the magnetic lines of force of the induction heating field, and a pair of fixtures for engaging the sides of each workpiece, the fixtures having external notches for coupling with the support rods of the frame to hold the workpiece in the correct angular relationship to the magnetic flux lines.

Figure 2:
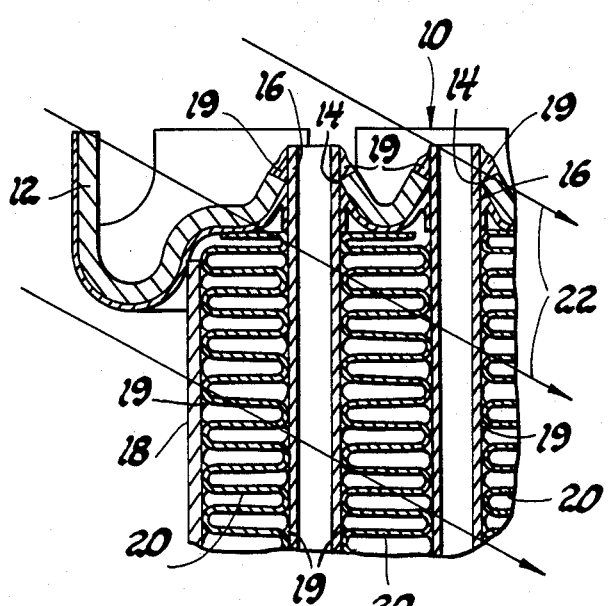
Figure 4:
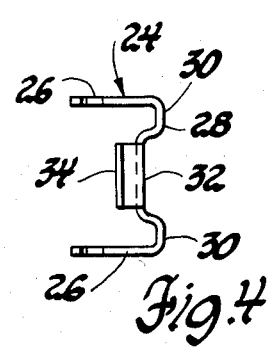
Figure 3:
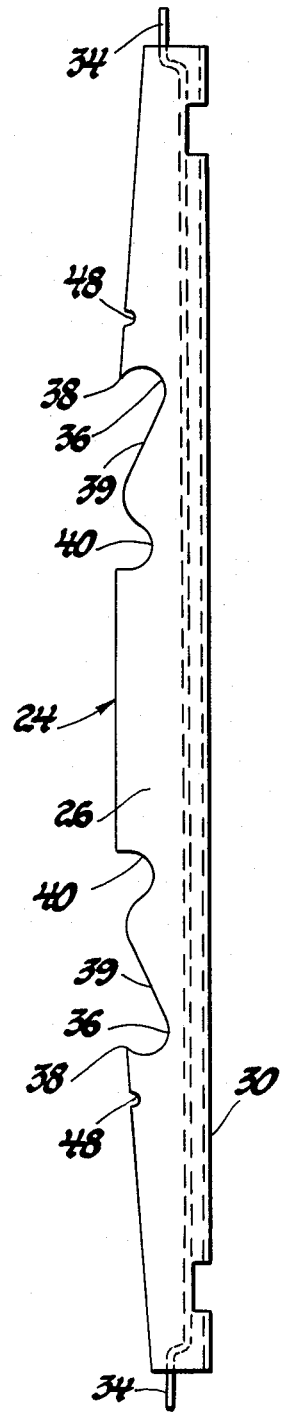
Figure 5:
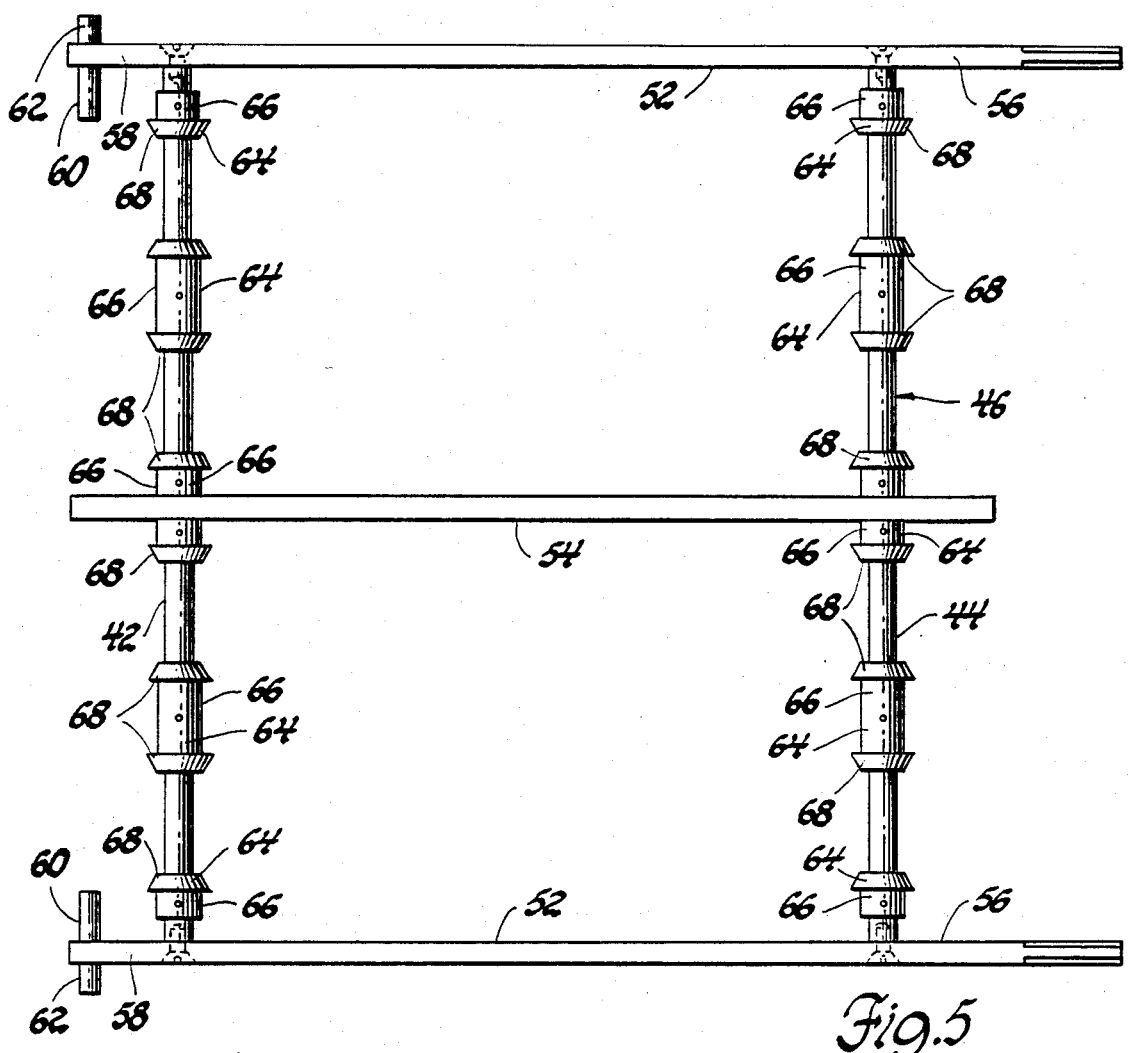
Figure 6:
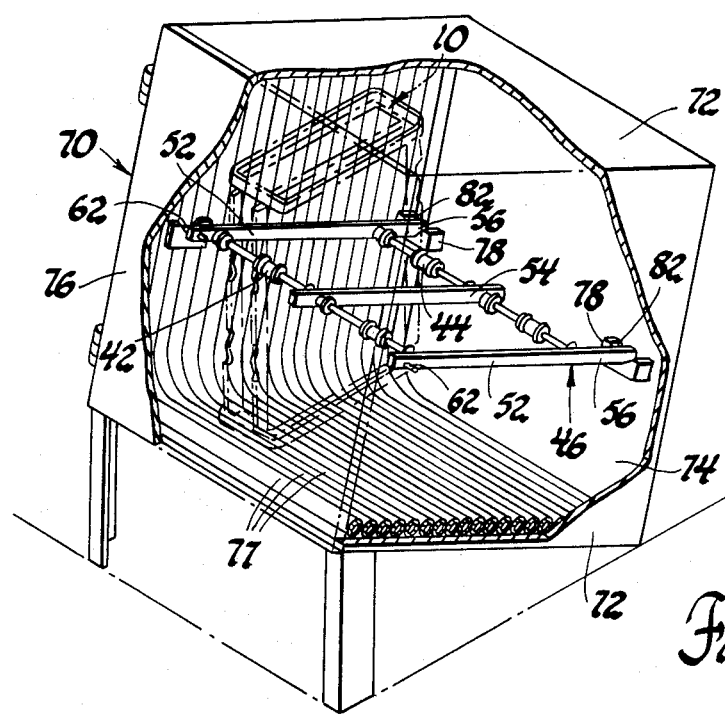

The above and other advantages of the invention will be made more apparent from the following specification taken in conjunction with the accompanying drawings wherein like reference numerals refer to like parts and wherein, FIG. 1 is an isometric view of a heat exchanger to be inductively heated and assembled to support fixtures and a support frame according to the invention, FIG. 2 is a partly broken away view of a heat exchanger showing details thereof and its relationship to the magnetic field used for induction heating thereof, FIG. 3 is a side view of one of the fixtures of FIG. 1, FIG. 4 is an end view of the fixture of FIG. 3, FIG. 5 is a top view of the support frame of FIG. 1 for holding the workpieces in an induction heating chamber according to the invention, and FIG. 6 is a partly broken away isometric view of an induction heating chamber with the support frame positioned according to the invention.

As shown in FIGS. 1 and 2 the workpiece to be brazed in an induction heating chamber is a heat exchanger or heater core comprising an assembly of various horizontal and vertical pieces of aluminum sheet metal at least some of which are coated with an aluminum brazing alloy which melts at a temperature just below the melting point of the aluminum sheet metal to flow into the joints of the assembly. Experience has shown that to properly form the joints, the horizontal and vertical portions of the assembly must be maintained in the horizontal and vertical planes respectively during brazing, else the flow of the molten metal along an inclined part can cause starvation of some joints thereby allowing leaks. In particular, the heat exchanger 10 comprises a pair of spaced parallel headers 12 each of which lies primarily in a horizontal plane and each header has an array of transverse parallel elongated openings 14 which receive the ends of flat tubes 16 that extend in planes perpendicular to the planes of the header 12. The tubes extend between the two headers and are to be joined to the headers by brazing. A pair of side plates 18, one on each side surface of the workpiece extend between headers 12 in a direction parallel to the tubes 16 and spaced from the nearest tube 16 by an amount equal to separation between the tubes 16. These elements 12–18 are coated on one side with brazing alloy 19 which, when molten, tends to flow into the joints. The spaces between the tubes 16 and between the outer tubes 16 and a side wall 18 contain fins 20 comprising sinuous ribbons of metal in contact with the tubes and sidewalls respectively, and are to be brazed at the points of contact to assure good thermal conductivity. The arrows 22 in FIG. 2 depict the lines of flux of the heating magnetic field. The magnetic field is at such an angle to both the horizontal and vertical planes that the horizontal and vertical parts of the heater core assembly will be heated by equal amounts. Thus, as will be seen, the induction heating coil and the heating chamber itself is tilted at an angle to properly position the magnetic field while the headers 12 in the chamber remain horizontal.

As shown in FIG. 1, a fixture 24 is assembled to each side of the workpiece 10 in engagement with the side plates 18. The fixtures preferably are formed of cold-rolled steel to perform at least three different functions. First, they lend support and rigidity to the workpieces to hold the vertical parts of the assembly in contact during the brazing operation; second, they serve as heat panels transferring heat to the side plates 18 so that those plates do not experience low temperatures due to radiation heat loss; and third, the fixtures offer a convenient means for supporting the workpieces within the heating chamber. It is the latter function which is of primary interest in connection with the present description.

FIGS. 3 and 4 show the fixture 24 in detail. It has a generally channel-shaped cross-section with side flanges 26 connected by a web 28 which, as viewed in FIG. 4, has marginal portions 30 adjacent the flanges 26 for engaging the side plates 18 of the workpiece and a depressed central portion 32 slightly spaced from the side plates when assembled thereto. This shape lends rigidity to the fixture and allows thermal and mechanical contact with the side plates 18. End flanges 34 at each end of the fixtures are sufficiently spaced away from the plane of the web 28 to allow engagement with the ends of the headers 12 as shown in FIG. 1. The outer edge of each side flange 26 carries two sets of recesses or notches for engaging support rods 42 and 44 of a frame 46 also shown in FIG. 1. Each of the notches is primarily arcuate to conform to the corresponding support rod. First notches 36 are near the ends of the fixture and the arcuate surface of each meets the edge of the flange at a point 38 to define a hook portion while the other side of the notch defines a sloping ramp 39. Each notch 36 is formed for easy engagement with an upper support rod 42 and firm retention on the rod. The symmetrical disposition of the notches allows the part to be turned end for end and applied to the workpiece in either orientation. Another pair of notches 40 adjacent and inboard of the notches 36 contiguous with the ramps 39 are placed to engage a lower support rod 44. When the notches are seated on the rails 42, 44 the assembly cannot rotate in the counter-clockwise direction, as viewed in FIG. 1, and thus resists rotation by the magnetic field which acts in that direction. Very small notches 48 outboard of the notches 36 receive wires 50 which bind the fixtures to the workpiece. The notches or recesses 36 and 40 are located so that when they are in engagement with the support rails 42 and 44, the workpiece center of gravity will be below the plane of the frame 46 to allow the workpiece and fixtures to seat in a stable manner in the frame. In addition, the notches are located so that when the workpiece is positioned within the induction heating chamber with the horizontal and vertical parts in their respective planes, the plane of the support frame will be parallel to the magnetic lines of flux within the induction chamber.

As best shown in FIG. 5, the frame 46 which holds the workpieces or assemblies in the chamber comprises the upper and lower support rods 42, 44 which are engaged at their ends by side rails 52 and at their centers by a center rail 54 each of rectangular cross section. The side rails 52 each have a rear portion 56 projecting beyond the support rod 44 and a forward portion 58 extending beyond the support rod 42. A spring pin 60 is carried by each forward portion 58 in front of support rod 42 and lies parallel to the support rod 42. Each pin 60 includes an outboard projection 62 extending laterally beyond its respective side rail 52. A plurality of workpiece locators 64 positioned on the support rods 42 and 44 assist in assembling the workpieces to the support frame and holding the workpieces in an even spaced configuration. Each locator 64 comprises a tube portion 66 surrounding a support rod and fastened thereto and having a frusto-conical head 68 on one or both ends for engagement of a fixture flange 26. The members of the frame 46 other than the spring pins 60 are preferably made of stainless steel for strength, durability, and high resistivity relative to the workpiece material. Due to the angle which the frame makes with the vertical parts of the workpiece, the support rods 42 and 44 are spaced by a distance much larger than the combined span of the fixtures and workpiece, so that it is easy to load the workpieces to the frame and to unload them.

FIG. 6 depicts an induction heating chamber 70 which is inclined to the horizontal so that a magnetic flux extending axially through the chamber will make the proper angles with the assembly parts which are positioned squarely in the horizontal and vertical planes. Since the chamber itself does not form a part of this invention, a detailed disclosure is not contained here. As depicted the chamber is box-shaped with four side walls 72, a rear wall 74 closing one end of the box and a hinged door 76 forming a closure for the other end of the box. Induction heating coils 77 inside the chamber extending along the side walls carry current for producing a magnetic flux through the chamber and parallel to the side walls of the chamber. A pair of brackets 78 are secured to the rear wall 74 and a pair of forward brackets 80 (only one shown) are secured, for example by adhesive, to the coils 77 near the door 76. The brackets 78 each contain a notch 82 for receiving one of the rear portions 56 of a side rail 52 and the brackets 80 are notched to receive the outboard projections 62 of the spring pins 60. Alternatively, the brackets 80 may be mounted on a cantilevered structure (not shown) supported on the rear wall 74. In any event, the four brackets form a secure seat for the support frame 46 which holds the workpieces and allows the frame loaded with workpieces to be readily inserted into and removed from the chamber 70. The brackets 80 and 78 are located so that the plane of the support frame will be parallel to the direction of magnetic flux within the chamber.

When the frame is positioned in this manner the lines of flux will cut a minimal dimension of the frame to minimize the induction of eddy currents in the frame thereby minimizing the heat energy dissipated in the frame. The relatively high resistance of the frame material also reduces the size of eddy currents induced in the frame. Eddy currents will, however, be induced in the workpieces and the fixtures supported by the frame and interaction of the magnetic flux with the currents produces a torque on the workpieces in a direction tending to lift the frame from the rear brackets 78. If the weight of the combined frame, workpieces and fixtures is sufficient to overcome the torque then no actual levitation will occur. If the weight is not sufficient then levitation is prevented by adding to the bracket 78 or the end wall 74 an element which engages the top of the rear portion 56 thereby trapping the frame and, due to the notched engagement of the fixtures in the frame, preventing any movement of the workpieces during the induction heating process.

It will thus be seen that this arrangement for supporting workpieces during induction heating lends stability and rigidity to the workpieces, maintains the workpieces in the correct position, allows only minimal heating of the support frame and facilitates easy loading and unloading of the workpieces.

The embodiments of the invention in which an exclusive property or privilege is claimed are defined as follows:

1. In an induction heating system for heating an assembly of elongated vertical and horizontal parts within a chamber utilizing a magnetic field disposed at an angle to the vertical and horizontal planes, means for supporting the assembly within the chamber comprising a generally rectangular steel frame including a pair of support rods, means for supporting the frame within the chamber with the plane of the frame parallel to the magnetic field to minimize inductive heating of the frame, and a pair of elongated fixtures for gripping opposite sides of the assembly, and recess means in each fixture for cooperatively engaging a support rod to support the assembly within the chamber.

2. In an induction heating system for heating an assembly of elongated vertical and horizontal parts within a chamber utilizing a magnetic field disposed at an angle to the vertical and horizontal planes, means for supporting the assembly within the chamber comprising a generally rectangular steel frame including a pair of support rods, means for supporting the frame within the chamber with the plane of the frame parallel to the magnetic field to minimize inductive heating of the frame, and a pair of elongated fixtures for gripping opposite sides of the assembly, the fixtures having inboard portions conforming to the sides of the assembly, each fixture having an outboard portion with a plurality of recesses for interchangeably engaging either of the support rods to support the assembly within the chamber.

3. In an induction heating system for heating an assembly of elongated vertical and horizontal parts within a chamber utilizing a magnetic field disposed at an angle to the vertical and horizontal planes, the field creating a force tending to rotate the assembly, means for supporting the assembly within the chamber comprising a generally rectangular steel frame including a pair of support rods coupled by a pair of connecting rails, means for supporting the frame within the chamber with the plane of the frame parallel to the magnetic field to minimize inductive heating of the frame, and a pair of elongated fixtures for gripping opposite sides of the assembly, means for securing the fixtures to the assembly and recess means in each fixture for cooperatively engaging a support rod to support the assembly within the chamber and to oppose rotation of the assembly.

4. In an induction heating system for heating assemblies of elongated vertical and horizontal parts within a chamber utilizing a magnetic field disposed at an angle to the vertical and horizontal planes, the field creating a force tending to rotate the assemblies, means for supporting the assemblies within the chamber comprising a generally rectangular steel frame including a pair of support rods, the support rods being sufficiently long to hold the assemblies in side-by-side relation, means for supporting the frame within the chamber with the plane of the frame parallel to the magnetic field to minimize inductive heating of the frame, and a pair of elongated fixtures releasably secured to opposite sides of each assembly, and recess means in each fixture for cooperatively engaging a support rod to support the assembly against rotation within the chamber, whereby a plurality of assemblies are supported by the frame within the chamber.

* * * * *